United States Patent [19]

DuBois et al.

[11] Patent Number: 4,666,573

[45] Date of Patent: May 19, 1987

[54] SYNTHETIC DIAPHRAGM AND PROCESS OF USE THEREOF

[75] Inventors: Donald W. DuBois, Akron; Colonel R. Dilmore; W. Bruce Darlington, both of Wadsworth, all of Ohio

[73] Assignee: PPG Industries, Inc., Pittsburgh, Pa.

[21] Appl. No.: 869,554

[22] Filed: Jun. 2, 1986

Related U.S. Application Data

[63] Continuation-in-part of Ser. No. 772,978, Sep. 5, 1985, abandoned.

[51] Int. Cl.$^4$ .............................................. C25B 13/08
[52] U.S. Cl. ...................................... 204/98; 204/128; 204/283; 204/296; 162/157.2; 162/164.2
[58] Field of Search .......................... 162/157.2–157.5, 162/164.2; 204/98, 128, 283, 296

[56] References Cited

U.S. PATENT DOCUMENTS

| | | | |
|---|---|---|---|
| 3,928,166 | 12/1975 | O'Leary et al. ...................... | 204/283 |
| 4,021,327 | 5/1977 | Grot ..................................... | 204/296 |
| 4,112,149 | 9/1978 | Babinsky .............................. | 427/34 |
| 4,118,308 | 10/1978 | Specht ................................. | 204/296 |
| 4,154,666 | 5/1979 | Patil et al. ........................... | 204/283 |
| 4,204,941 | 5/1980 | Niccolini ............................. | 204/296 |
| 4,210,515 | 7/1980 | Patil et al. ........................... | 204/266 |
| 4,243,504 | 1/1981 | Fang et al. .......................... | 204/296 |
| 4,302,303 | 11/1981 | Guillaume et al. ................. | 204/296 |
| 4,311,566 | 1/1982 | McCann ............................. | 204/283 |
| 4,410,411 | 10/1983 | Fenn, III et al. ................... | 204/283 |
| 4,432,860 | 2/1984 | Bachot et al. ...................... | 204/296 |
| 4,434,116 | 2/1984 | Covitch ............................... | 264/49 |
| 4,506,035 | 3/1985 | Barnett et al. ...................... | 521/53 |
| 4,539,085 | 9/1985 | Bachot et al. ...................... | 204/98 |

Primary Examiner—Terryence Chapman
Attorney, Agent, or Firm—Bruce H. Cottrell

[57] ABSTRACT

A non-asbestos, electrolyte permeable diaphragm fabricated of thermoplastic organic polymer material containing ion exchange functional groups or precursor groups thereof is disclosed. The diaphragm can be prepared by providing a slurry of the organic polymer material, depositing the organic polymer material upon a cathode substrate and treating the organic polymer material to secure a stable diaphragm.

38 Claims, No Drawings

SYNTHETIC DIAPHRAGM AND PROCESS OF USE THEREOF

This application is a continuation-in-part of commonly assigned, copending application Ser. No. 772,978, filed Sept. 5, 1985, now abandoned, the specification of which is incorporated herein by reference.

BACKGROUND OF THE INVENTION

The present invention relates to diaphragms useful in electrolytic cells utilized for the electrolysis of solutions, especially useful in electrolytic cells utilized for the electrolysis of aqueous alkali metal halide solutions, e.g., sodium chloride brine. More particularly, this invention relates to non-asbestos diaphragms useful in such cells.

Alkali metal halide brines, such as sodium chloride brines and potassium chloride brines, may be electrolyzed in a diaphragm-type cell to yield chlorine, hydrogen, and aqueous alkali metal hydroxide. A diaphragm-type cell (hereinafter referred to as a diaphragm cell) includes a diaphragm dividing the cell into an anolyte compartment with an anode therein and a catholyte compartment with a cathode therein. In such a diaphragm cell, brine is fed to the anolyte compartment and a halogen, e.g., chlorine is evolved at the anode. Electrolyte percolates from the anolyte compartment through the electrolyte permeable diaphragm to the catholyte compartment where hydroxyl ions and hydrogen gas are evolved at the cathode. Optionally, an oxygen cathode may be used to reduce the cell voltage and consequently eliminate the production of hydrogen. The product in the catholyte compartment is commonly referred to as cell liquor and contains a mixture of alkali metal hydroxide and alkali metal halide.

The majority of commercial diaphragms have been comprised of fibrous asbestos. These diaphragms can be formed by vacuum-deposition of asbestos from a slurry onto an electrolyte permeable cathode. Unfortunately, asbestos diaphragms have suffered from short lifetimes of about 6 to 8 months. The development of dimensionally stable metal anodes led to a search for diaphragms with longer life. Asbestos diaphragms have been strengthened by vacuum-depositing the asbestos from an aqueous slurry containing sodium hydroxide and baking the diaphragm at between 110°–280° C. for at least 2 hours as described in U.S. Patent No. 3,991,251. Various polymer resins have also been included in a resin-asbestos diaphragm as shown by, e.g., U.S. Pat. Nos. 3,694,281; 3,723,264; 3,853,721; and 4,093,533.

Microporous separators without asbestos have been produced by sintering materials such as polytetrafluoroethylene (PTFE) and a particulate pore forming additive followed by subsequent removal of the additive, as shown by, e.g., U.S. Pat. Nos. 3,930,979; 4,098,672; and 4,250,002. While such microporous separators have a long service life, they have been produced in the form of sheets and are not easily utilized in electrolytic cells having complex non-planar electrode geometries, such as diaphragm cells with fingered anodes and cathodes. The need remains for an improved diaphragm, preferably a non-asbestos diaphragm, which can be used in cells having such non-planar electrodes.

Besides a desire to eliminate asbestos, the catholyte or cell liquor recovered after electrolysis of sodium chloride brine in typical asbestos diaphragm cells generally has a sodium hydroxide concentration of about 10 to 12 weight percent and a sodium chloride concentration of about 12 to 16 weight percent. Cell liquor must then be processed to separate sodium chloride and concentrate the sodium hydroxide to a generally desired level of about 50 weight percent. This processing is energy intensive. Production of cell liquor having a greater concentration of sodium hydroxide is desirable. Yet, diaphragm cells with asbestos-type diaphragms have difficulties in achieving a catholyte with a sodium hydroxide strength in excess of 12 or 13 weight percent under economically tolerable current efficiencies.

Therefore, it is highly desirable to have a non-asbestos diaphragm which can be readily utilized in diaphragm cell equipment currently in operation. Further, it is desirable to have a diaphragm which allows brine electrolysis to proceed so as to obtain sodium hydroxide concentrations within the catholyte from about 12 to 20 weight percent or more, preferably greater than about 15 weight percent at current efficiencies of greater than about 88%. Finally, it is desirable to have a non-asbestos diaphragm capable of a reduced operational voltage in comparison to previous asbestos-containing diaphragms.

SUMMARY OF THE INVENTION

The invention herein contemplated provides novel electrochemical cell diaphragms, a novel method of making such diaphragms, and a method of using such diaphragms in an electrochemical process, for example, the electrolysis of aqueous alkali metal halides.

The novel diaphragms of this invention are fabricated of thermoplastic organic polymer material, e.g., particulates or fibers, containing functional groups selected from the group consisting of —COOR, —COOM, —COX, —CN, —CONR'R", —SO$_3$M, —SO$_2$NH$_2$, —PO(OR)$_2$, —PO(OM)$_2$, —PO(OX)$_2$, —OPO(OR)$_2$, —OPO(OM)$_2$, —OPO(OX)$_2$ where R is an aryl or a C$_1$ to C$_{10}$ alkyl group; M is H, an alkali metal or an ammonium group; R' and R" are each independently either H or a C$_1$ to C$_{10}$ alkyl group; and X is Cl or F. The organic polymer material can be perfluorinated to provide chemical resistance to the hostile cell environments such as those found in a chlor-alkali cell. The diaphragms can further include a minor amount of a diluent polymer material, e.g., fibrillated polytetrafluoroethylene. The diluent polymer material can provide structural reinforcement.

A method of producing diaphragms for electrolytic cells in accordance with this invention comprises providing a slurry of thermoplastic organic polymer material, e.g., particulates or fibers, containing the functional groups, depositing a layer of the organic polymer material upon a foraminous cathode of an electrolytic cell, and treating the polymer-material coated cathode to secure the organic polymer material upon the cathode. The organic polymer material having functional groups can be perfluorinated, and the functional groups are chosen from the group of —COOR, —COOM, —COX, —CN, —CONR'R", —SO$_3$M, —SO$_2$NH$_2$, —PO(OR)$_2$, —PO(OM)$_2$, —PO(OX)$_2$, —OPO(OR)$_2$, —OPO(OM)$_2$, —OPO(OX)$_2$ where R is an aryl or a C$_1$ to C$_{10}$ alkyl group; M is H, an alkali metal or an ammonium group; R' and R" are each independently either H or a C$_1$ to C$_{10}$ alkyl group; and X is Cl or F. The slurry can further include a diluent thermoplastic material, e.g., a second organic polymer material. The diaphragms of this method are liquid permeable allowing for percolation of electrolyte between the anolyte and catholyte compartments. Optionally, a pore forming material can be codeposited from the slurry and subsequently removed to provide additional porosity to the diaphragms.

In another embodiment, the method of producing the diaphragms of this invention includes providing a slurry of a structural supportive diluent polymer material, a pore forming material, e.g., a fibrous pore forming material and a dissolved organic polymer material having the functional groups, depositing a layer of the structural supportive diluent polymer material, the pore forming material and the dissolved organic polymer material upon a foraminous cathode of an electrolytic cell, and removing the residual slurry medium whereby the deposited materials are secured upon the cathode.

In a further embodiment, the diaphragms are produced by depositing a layer of the pore forming material and the structural supportive diluent polymer material from a slurry onto a cathode, impregnating the layer of such materials with a solution or dispersion of organic polymer material having the functional groups, and removing residual liquid, i.e., residual slurry medium or residual solvent from the impregnated layer to secure the diaphragm upon the cathode.

The diaphragms of this invention can be used in a process for electrolyzing an alkali metal halide brine in an electrolytic cell having an anolyte compartment with an anode therein separated by a diaphragm from a catholyte compartment with a cathode therein. Alkali metal halide brine, e.g., sodium chloride brine, is fed to the anolyte compartment of the cell, brine is percolated through the diaphragm, electric current is passed from the anode to the cathode, and a catholyte liquor, i.e., cell liquor, containing alkali metal halide and alkali metal hydroxide is recovered from the cell. With a highly saturated sodium chloride brine feed having about 290 to 330 grams per liter (g/l) sodium chloride, the diaphragms of this invention can allow production of cell liquor containing from about 12 to 20 weight percent or more sodium hydroxide, more preferably greater than about 13 weight percent sodium hydroxide. This process can be achieved at high current efficiencies of above about 88% and at voltages equal to or less than those attainable by present asbestos and asbestos-resin diaphragms.

DETAILED DESCRIPTION OF THE INVENTION

The synthetic diaphragms herein contemplated for use in electrolytic cells are characterized as a composite of organic polymer material. The organic polymer material can be in the form of, e.g., particulates or fibers and the diaphragm is hydrophilic or becomes hydrophilic prior to or during use, i.e., it is wettable by water or aqueous solutions. In the form of fibers, the organic polymer material generally has a fiber length of up to about ¾ inch and diameters of about 0.01 to 250 microns, preferably about 0.1 to 100 microns and most preferably about 0.1 to 50 microns. Branched fibers can aid in providing the desired diaphragm porosity and can assist in securing the diaphragm through intertwining of the fibers. Branched fibers can be provided by defibrillating the fibers, e.g., chopping, mashing or breaking the fibers in high-shear mixing equipment to give the branched structure. The organic polymer material contains functional groups. The functional groups are either ion exchange groups or can be converted to ion exchange groups such as sulfonic acid, phosphoric acid, phosphonic acid, or carboxylic acid groups, and alkali metal or ammonium salts thereof. These ion exchange groups provide the diaphragm with permionic properties.

Diaphragms of this invention should have a thickness of about 0.01 to 0.25 inches, preferably about 0.02 to 0.10 inches to achieve optimum benefits. Thus, by virtue of utilizing the diaphragms of this invention it is possible to employ a thinner diaphragms in comparison with typical asbestos-type diaphragms which are commonly over about 0.125 inches thick. Reduced thickness of the synthetic diaphragm in combination with the ion exchange characteristics of the organic polymer material lowers electrical resistance and results in reduced voltage drop during cell operation. Further, the synthetic diaphragms have a high degree of dimensional stability and do not swell during cell operation as was the tendency of many asbestos diaphragms. The dimensional stability of these diaphragms allows the inter-electrode gap between the anode and cathode to be reduced. The inter-electrode gap can be reduced, e.g., in a zero gap cell construction, to the thickness of the synthetic diaphragm. The reduced electrode gap combines with the lower resistance of the synthetic diaphragm to provide a more energy efficient cell.

The diaphragms of this invention are liquid permeable, thus allowing an electrolyte subjected to a pressure gradient to pass through the diaphragm. Typically, the pressure gradient is a result of a hydrostatic head on the anolyte side of a cell, that is, the level in the anolyte compartment will be on the order of from about 1 to 25 inches, although higher or lower levels are possible and restricted only by space or electrolytic cell hardware limitations. The specific flow rate of electrolyte through the diaphragm can vary with the type and use of the cell. In a chlor-alkali cell, for example, the diaphragm should be able to pass about 0.001 to 0.5 cubic centimeters of anolyte per square centimeter of diaphragm surface area per minute. The flow rate is generally set at a rate that allows a predetermined, targeted product concentration, e.g., sodium hydroxide concentration, and the level differential between the anolyte and the catholyte compartments is then related to the porosity of the diaphragm and the tortuosity of the pores. For use in a chlor-alkali cell, the synthetic diaphragm will preferably have a permeability similar to that of an asbestos-type diaphragm so that the present cell equipment can be utilized.

The term "electrolytic cell", as used herein, contemplates any type of cell wherein an electrolytic solution is passed through an electrical field generated between an anode and a cathode to dissociate an electrolyte and to synthesize chemicals. For example, chlorates, perchlorates, hydroxides, dithionites, carbonates and the like can be manufactured and recovered in such cells. The diaphragms of this invention are especially suitable for use in a chlor-alkali electrolytic cell wherein, for example, sodium chloride brine is electrolyzed to produce sodium hydroxide and chlorine.

Organic polymer material containing the functional groups is incorporated into the diaphragm in any suitable form, e.g., as fibers, fibrils, filaments, threads, particulates, slivers, platelets, plates, ribbons, or particles. Mixtures of the various forms or shapes can be readily added to the slurry during deposition of the diaphragm. Such variety of organic polymer material may assist in obtaining the desired permeability properties of the diaphragm. While the diaphragms preferably are fabricated from a major amount of the organic polymer material having functional groups, and more preferably from a substantially fibrous organic polymer material having functional groups, the diaphragms can be formed from shapes and forms of such organic polymer material other than as fibers. Generally, the use of a major amount of fibers is advantageous in achieving the desired tortuosity and permeability. Preferably, the diaphragm contains substantially fibrous organic polymer material, i.e., the organic polymer material is predominately fibrous.

In the present invention, fibers of the organic polymer material having functional groups, either as ion exchange groups or ion exchange group precursors, can be formed, for example, by solvent extrusion or hot extrusion through a die to form a filament or fiber and thereafter stretching or drawing the filaments to reduce their diameter. The process is similar to the method for forming permionic membrane sheets described in European Patent Application No. 0094679. The temperatures during the extrusion step can be generally in the range of from 180°–280° C. and will depend on the chosen organic polymer material.

Another manner of preparing fibers from organic polymer material having functional groups, e.g., ion exchange groups or ion exchange group precursors is to draw a strand as a base or template through a bath of melted organic polymer material having such functional groups or a solution of organic polymer material having such functional groups. The strand serving as the base or template should be subsequently removable or destructible, e.g., by leaching or dissolving the strand with a solvent or chemical reactant, or by thermal decomposition. The template strand can be, e.g., a strand of cotton, cellulose, wool, rayon, or any suitable polymer, e.g., polyesters such as polyethylene terephthalate, and polyamides such as nylon. The organic polymer material can soak into or onto the template strand as the strand is drawn through the resin bath or solution. The resulting combination of template strand and resin can be allowed to cool or dry and the template strand then removed, e.g., by chemically dissolving it. A hollow organic polymer fiber strand containing ion exchange groups can thus be obtained. This strand can be chopped to the desired length, defibrillated to provide a branched structure and used in depositing diaphragms of such fibers onto a diaphragm cell cathode.

The organic polymer material will generally be a copolymer formed by polymerizing a fluoro-vinyl ether monomer containing a functional group, i.e., an ion exchange group or a functional group easily converted to an ion exchange group and a monomer chosen from the group of fluorovinyl compounds, e.g., vinyl fluoride, vinylidene fluoride, trifluoroethylene, tetrafluoroethylene, hexafluoropropylene, chlorotrifluoroethylene, and perfluoro(alkyl vinyl ether) with alkyl being a $C_1$ to $C_{10}$ alkyl group. The functional groups are —COOR, —COOM, —COF, —COCl, —CN, —CONR'R", —SO$_3$M, —SO$_2$NH$_2$, —PO(OR)$_2$, —PO(OM)$_2$, —PO(OX)$_2$, —OPO(OR)$_2$, —OPO(OM)$_2$, and —OPO(OX)$_2$, where R is an aryl group or a $C_1$ to $C_{10}$ alkyl group, R' and R" are each independently either hydrogen or a $C_1$ to $C_{10}$ alkyl group, M is hydrogen, an alkali metal or an ammonium group, and X is Cl or F. The functional ion exchange group is a cation selective group, e.g., a sulfonic acid group, a phosphoric acid group, a phosphonic acid group or a carboxylic acid group, or an alkali metal or ammonium salt thereof. In the case of copolymers which will be used in the electrolysis of brine, the fluorinated vinyl compound desirably will not contain hydrogen.

The organic polymer material may also be a terpolymer formed by polymerizing a monomer from the group of fluorovinyl compounds listed above and two other monomers chosen from different carboxylic acid functional monomers. One monomer can be represented by the formula CF$_2$=CF—O—CF$_2$—CFOCF$_2)_a$—(CFX')$_b$—(CF$_2$OCFX")$_c$—A wherein a is 0 to 3, b is 0 to 6, c is 0 to 4 and either a or c is not 0; and a plus b plus c is greater than or equal to 3; X, X' and X" are the same or different and each represents —F or —CF$_3$; A represents —CN, —COF, —COOH, —COOR, —COOM or —CONR'R"; R represents an aryl group or a $C_{1-10}$ alkyl group; R' and R" each independently either are hydrogen or a $C_{1-10}$ alkyl group; and M is an alkali metal or an ammonium group. The other monomer can be represented by the formula CF$_2$=CF(O)$_s$—(CFQ)$_t$—A' wherein A' is defined similar to A above, s is 0 or 1, t is 1 to 6 and Q represents —F or a $C_{1-5}$ perfluoroalkyl group.

Alternatively, the terpolymer can include a monomer from the group of fluorovinyl compounds previously listed, a monomer from the formula CF$_2$=CF—O—CF$_2$—(CFXOCF$_2)_a$—(CFX')$_b$—(CF$_2$OCFX")$_c$—A as described above and a monomer chosen from a group represented by the formula CF$_2$=CF—(OCF$_2$CFZ)$_e$—(O)$_f$—(CFZ')$_g$—B where Z and Z' each independently either are F or a $C_{1-10}$ perfluoroalkyl group, e is 0 to 3, f is 0 or 1, g is 0 to 12 and B is —H, —F, —Cl, —CHF$_2$ or —CF$_3$ and the monomer contains no ion-exchange groups and no functional groups which can be converted to ion-exchange groups.

The organic polymer material may also be a polymer prepared by copolymerizing a monomer chosen from among the fluorovinyl compounds previously listed, preferably either tetrafluoroethylene or chlorotrifluoroethylene, a second monomer represented by the formula FSO$_2$CF$_2$CF$_2$O(CF(CF$_2$X)CF$_2$O)$_n$—CF=CF$_2$ where X is Cl, Br or F and n is 0 to 3, and a third monomer, i.e., a vinyl ether monomer represented by R—OCF=CF$_2$ where R is preferably XCF$_2$CF$_2$CF$_2$— or

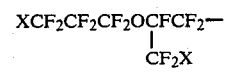

where X is Cl or F. The resultant pendant groups on the polymer can be represented by the formula (YSO$_3$(CFR$_h$)$_i$(CFR$_{h'}$)$_j$)O— where i and j are independently 0 to 3 and i+j is at least 1, R$_h$ and R$_{h'}$ are independently selected from the group consisting of a halogen and a substantially fluorinated alkyl group having one or more carbon atoms, and Y is hydrogen or alkali metal.

Optionally, the organic polymer material may be a highly fluorinated polymer material, e.g., a polyfluorocarbon, preferably polytetrafluoroethylene, upon which functional groups such as those previously described have been attached by a process such as radiation grafting. For example, a substrate of polytetrafluoroethylene in the form of, e.g., particulates or fibers, and a fluorinated monomeric material containing the functional groups may be subjected together to continuous or intermittent radiation by gamma-rays, X-rays or electron beams, preferably gamma-ray. Generally, such irradiation of the substrate material and the monomeric material may be conducted in the presence of a solvent for the monomeric material.

The particulates or fibers of the organic polymer material having the functional groups and, optionally, a solution of such organic polymer material, used in the preparation of the diaphragms, can be of the same material as those presently available for use as electrolyte impermeable ion exchange membranes in various electrolytic cells. Among these membrane materials are those known as Nafion ®, supplied by E. I. DuPont de Nemours & Company and those known as Flemion ®, supplied by Asahi Glass Company, Ltd. Such membrane materials generally may have molecular weights from about 1000 up to 1,000,000 or more. Solutions of such organic polymer materials can generally be formed more easily from those materials having lower molecular weights, e.g., from about 1000 to 200,000. Generally, where such materials include a sulfonyl type functional group, the equivalent weight of the material is from about 600 to 2000, and where such materials include a carboxylic functional group, the equivalent weight of the material is from about 700 to 1200. Equivalent weight is the weight of polymer in grams which contains one equivalent of potential ion exchange capacity. Typically, lower voltages are obtained with lower equivalent weight material, and higher current efficiencies are obtained with higher equivalent weight materials. The optimum material for the synthetic diaphragm can be selected to achieve a desired balance between voltage and current efficiency.

As described above, the diaphragm can be prepared from the organic polymer material containing the functional groups either as ion exchange groups or as ion exchange group precursors. For use in ion exchange applications and in cells, for example, a chlor-alkali cell for electrolysis of brine, the diaphragm should have all of the functional groups converted to ionizable functional groups. Such conversion is ordinarily and conveniently accomplished by hydrolysis with acid or base, such that the functional groups are converted to the free acid or the alkali metal salt thereof. For a diaphragm which will be used in a chlor-alkali cell, hydrolysis with an alkali metal hydroxide will convert the ionizable group to the form of the alkali metal salt, which is the eventual form of the group during cell operation.

In one embodiment of this invention the diaphragms can include the organic polymer material containing functional groups and a diluent thermoplastic organic polymer material without functional groups. The diluent thermoplastic organic polymer material without functional groups is hereinafter referred to simply as diluent material. The diluent material incorporated into the synthetic diaphragms can be, e.g., a particulate material, a fibrous material or any other suitably shaped material, which is compatible with the organic polymer material and stable in the intended cell environment. Preferably, the diluent material is less expensive than the organic polymer material since the diluent material does not contain functional groups, and can reduce the cost of the synthetic diaphragm. The diluent material can be chosen to provide the necessary chemical resistance to the cell environment. For superior chemical resistance, the diluent material can be a halocarbon resin, e.g., fluorocarbon, chlorocarbon, or chlorofluorocarbon resins such as polyvinyl chloride, polyvinylidene chloride, polyvinylfluoride, polyvinylidene fluoride, polyperfluoroethylenepropylene, polyperfluoroethylene, polychlorotrifluoroethylene, and the like. Preferably, the diluent material is perfluorinated where the diaphragm is used in a chlor-alkali cell.

Highly fibrillated polyfluorocarbon materials can be useful as the diluent material in this invention and can be, for example, polyvinylfluoride, polyvinylidene fluoride, polyperfluoro(ethylenepropylene), polytetrafluoroethylene, polychlorotrifluoroethylene and the like. Highly preferred is fibrillated polytetrafluoroethylene.

Fibrils of a polyfluorocarbon material, such as polytetrafluoroethylene (PTFE), can be prepared by slurrying PTFE powder in a liquid medium, e.g., water or a lower alkanol such as isopropanol and subjecting the slurry to high speed mixing in a commercial blender or mixer. When an aqueous slurry medium is used, a surfactant is preferably included to help in dispersing the fibrils. After fibrillation, the resultant PTFE fibrils generally have the following dimensions: length, about 100 to about 3000 microns; diameter, about 1 to about 150 microns; and average diameter, about 20 microns. The majority of the PTFE fibrils have diameters between about 5 and 50 microns. The size distribution of such a fibrillated polyfluorocarbon helps provide packing and entanglement of the fibrils within the diaphragm during deposition thereby providing structural support for the diaphragm.

Polyfluorocarbon fibrils can also be prepared by milling a mixture of polyfluorocarbon powder and a fibril inducing particulate, e.g., a solid granular inert material such as salt, i.e., sodium chloride, alumina, sand, limestone or graphite. After the polyfluorocarbon powder and the particulate have been milled, the particulate is removed, e.g., the salt can be dissolved.

Diluent material may lead to higher voltages during cell operation because the diluent material is not ion permeable. The addition of the diluent material can prevent a direct route through the diaphragm as the ion will take a longer path around the diluent. In effect, addition of the diluent material leads to reduction in the amount of the diaphragm which actively transports ions, thus increasing the operating voltage. An optimal economic balance may be chosen between the cost of the diaphragm, i.e., the percentage of diluent material versus organic polymer material, and the resultant voltage.

In preparing the diaphragms of the present invention, organic polymer material, in the form of, e.g., particulates or fibers having the functional groups, is suspended in a slurry. The slurry medium can be any liquid capable of providing a suspension of the organic polymer material, e.g., an aqueous liquid, miscible mixture of aqueous and organic liquid media, or an organic liquid. The organic liquid can be a $C_1$-$C_4$ alcohol such as methanol, ethanol, n-propanol, iso-propanol, n-butanol, iso-butanol or tert-butanol, a glycol such as ethylene glycol or propylene glycol, a polyol such as glycerol, pentaerythritol, or polyethylene glycol, an ester, e.g., an acetate or a carbonate such as ethylene carbonate or propylene carbonate, a heterocyclic liquid such as tetrahydrofuran or N-methylpyrrolidone, an amide such as N-methylformamide, dimethylformamide, N-methylacetamide or dimethylacetamide, and dimethylsulfoxide. The organic liquid medium used to slurry the organic polymer material can be slightly absorbed by the organic polymer material causing it to swell and soften. Since the organic liquids enumerated above will generally swell and soften the organic polymer material, the organic liquid can serve the dual purpose of a slurry medium and as a binding agent. In addition, the organic liquid will preferably swell the organic polymer material to a similar extent as the organic polymer material will swell when subjected to the operating cell environment, thereby limiting undesirable variations in size by the diaphragm between the deposition stage and the operation of the cell. Preferred organic liquids include N-methylpyrrolidone, dimethylformamide, dimethylsulfoxide, propylene carbonate, iso-propanol and ethanol, which can be used alone or in combination with water as the liquid slurry medium. Subsequent treatment of the organic polymer material deposited from an organic liquid medium can be by heating or a heating with pressure to secure the organic polymer material together. The slurry medium preferably has a boiling point greater than about 100° C. and can also include surfactants, viscosity modifiers or thixotropic agents to result in a sufficiently stable suspension.

An aqueous slurry can also contain a viscosity modifier or thickening agent to assist in the dispersion of, e.g., the organic polymer material or diluent material such as fibrillated polyfluorocarbon. For example, one particularly suitable thickening agent or viscosity modifier is a water soluble hydrocarbon polymer having acrylamido-methylpropanesulfonic acid groups and having a molecular weight of about 1 million (RHEO-THIK ®, a material available from Henkel Corp.). Generally from about 0.1 to about 5 percent by weight of the thickening agent can be added to the slurry mixture, basis total weight of slurry, more preferably from about 0.1 to about 2 percent by weight thickening agent.

A surfactant can also be added to aqueous slurries used in preparation of the diaphragms. A particular nonionic surfactant (a chloride of a polyethoxylated aliphatic alcohol) represented by the formula R—OR')$_x$Cl, wherein R is selected from the group consisting of $C_1$-$C_{30}$ linear and branched alkyl, R' is the substituted ethylene group, —$CH_2$—$CH(R'')$— wherein R'' is selected from hydrogen, methyl, ethyl or mixtures thereof and x is a number from 5 to 15, has been found advantageous in obtaining a well dispersed aqueous slurry of polyfluorocarbon fibrils. Preferably, R is selected from the group of $C_8$-$C_{15}$ linear or branched alkyl, R' is ethylene, and x is 9 or 10. Most preferably, for wetting and dispersing a polyfluorocarbon such as polytetrafluoroethylene R is a mixture of $C_{12}$-$C_{15}$ linear alkyls, R' is ethylene and x is 9. Generally from about 0.1 to about 3 percent by weight of the nonionic surfactant can be added to the slurry mixture, basis total weight of slurry, more preferably from about 0.1 to about 1 percent by weight of the nonionic surfactant.

The quantity of organic polymer fibers or particulates in the slurry medium can generally be in the range of about 0.2 to 20 weight percent, more preferably about 0.5 to 10 weight percent solids. The diaphragms can then be deposited from the slurry directly upon a substrate, e.g., a cathode, by vacuum, pressure, electrophoresis or combinations of such deposition techniques.

The diaphragms of this invention are deposited upon a porous substrate usually a porous cathode. The porous or foraminous cathode is electroconductive and can be a perforated sheet, a perforated plate, metal mesh, expanded metal mesh, metal rods or the like. For example, the openings in the foraminous cathodes commercially used today in chloralkali cells are usually about 0.05 to 0.125 inches in size. Most commonly the cathode will be of iron or an iron alloy. By iron alloy is meant a carbon steel or other alloy of iron. Alternatively, the cathode can be nickel or other cell environment resistant electroconductive material. Cathodes suitably used in this invention include those having an activated surface coating, for example, those cathodes with a porous Raney nickel surface coating. Raney nickel coatings can provide a reduction of hydrogen over-voltage at the cathode and allow a significant savings in energy consumption and cost in the electrolysis of brine. Raney nickel coatings can be provided by various expedients, e.g., one preferable coating is applied by electro arc spray metallization of two wires of a leachable metal and catalytic metal onto the cathode substrate followed by removal of the leachable metal as taught in U.S. Pat. No. 4,396,473, the teachings of which are herein incorporated by reference.

In some instances, the diluent material can serve as a binder and aid in joining or gluing the organic polymer material, e.g., fibers. For example, the diluent material can have a lower softening or melting point than the organic polymer material to effectively serve as a binder during a subsequent heat treatment wherein the diluent material can melt and wet the organic polymer material. Upon cooling the diluent material can fuse or weld, thus securing and binding the organic polymer material. The diaphragms can be fabricated of the organic polymer material having functional groups and an effective amount of the diluent material to bind the organic polymer material. While the diluent material can be particulate or fibrous, in this aspect of the invention there should be sufficient diluent material to melt upon a subsequent heat treatment and wet a portion of the organic polymer material and aid in joining, binding or securing the diaphragm, while there should be insufficient diluent material to wet and coat substantially all of the organic polymer material and thereby block the permionic properties of the organic polymer material. The use of fibrous diluent materials as binders may reduce the possibility of forming a continuous film of diluent upon the organic polymer material and blocking the permionic properties of the organic polymer material.

The amount of diluent material included in the diaphragm is generally a minor amount sufficient to provide some structural reinforcement, e.g., from about 0.01 to 35 weight percent, preferably from about 0.1 to 20 weight percent, and most preferably 0.1 to 10 weight percent. During a heat binding treatment to secure diaphragms including fibrous diluent material, the temperature can be raised to a temperature insufficient to completely melt the diluent material, but sufficient to soften the diluent fibers and secure the diluent at points of contact with other diluent fibers or with, e.g., organic polymer fibers thereby forming an intermixed, interfused diaphragm matrix. A highly fibrillated diluent material such as fibrillated PTFE can provide binding and structural support for the organic polymer material having the functional groups whether the organic polymer material is present in the form of particulates, fibers or a deposited solute. The entanglement of the fibrillated diluent material can provide support without heating the diaphragm at or near the melting or sintering point or the diluent material. The diaphragm can be secured by heating at temperatures sufficient to dry the diaphragm of, e.g., residual slurry medium, but at temperatures beneath the sintering or decomposition temperatures of either the diluent material or the organic polymer material with the functional groups. The deposited diaphragm with fibrillated polyfluorocarbon is generally heated at from about 50° C. to 225° C., more preferably from about 90° C. to 150° C.

In one manner of treatment after deposition, the polymer-coated cathode can be placed in an oven and raised to sufficient temperatures to secure the organic polymer material against the cathode. For best results the temperature will be high enough to cause joining, binding or bonding of the organic polymer material at contact points. Pressure may be applied, if desired, either by placing a positive force against the diaphragm or by using a vacuum on the other side of the foraminous cathode to draw the diaphragm against the cathode during the bonding operation. A temporary overlay can be utilized as an aid in applying pressure upon the diaphragm. The effective bonding conditions are easily determined experimentally.

The extent of packing by the organic polymer material upon the porous substrate, i.e., a foraminous cathode, can be reasonably well controlled by varying the amount of pressure differential. An especially effective expedient for achieving a desired degree of compression or packing of the organic polymer material containing functional groups without destroying or seriously effecting the necessary degree of diaphragm porosity entails placing a topcoat over the deposited material. Preferably the topcoat is a temporary overlay which is less permeable than the deposited diaphragm material, i.e., the organic polymer material having functional groups and optionally, particulate or fibrous diluent material. A pressure differential can then be applied to draw the topcoat against the porous diaphragm polymer material thereby compressing the material against the substrate. The topcoat can generally be a solid material, overlay or film, e.g., a non-porous Teflon film, or a coating of material such as cellulose or rayon, in a form of, for example, fibers or particulates.

In preparing the diaphragms of this invention which include organic polymer material having functional groups and a diluent material, both the organic polymer material and the diluent material can be incorporated in a liquid medium capable of forming a well dispersed suspension of both materials. Suitable liquid media are, for example, water with appropriate surfactant and thickening agent, an organic liquid such as a $C_1$–$C_4$ alcohol, propylene carbonate, ethylene carbonate, ethylene glycol, propylene glycol, glycerol, pentaerythritol, polyethylene glycol, N-methylpyrrolidone, tetrahydrofuran, dimethylformamide, N-methylformamide, dimethylacetamide, N-methylacetamide, and dimethylsulfoxide, or a miscible mixture of aqueous and organic liquid media. A well dispersed suspension is then established as by good agitation, and the diaphragms deposited from the slurry or suspension by vacuum deposition techniques well known in the art or any other convenient expedient. Thus, ideally both the materials can be deposited from the slurry or dispersion directly upon a substrate, e.g., a foraminous cathode of an electrolytic cell.

Whenever diluent materials are included in the slurry mix, e.g., as a particulate material or a fibrous material, any organic liquid in the slurry medium may additionally soften the diluent material. This can be particularly desirable with a fibrous diluent material. Where the slurry medium includes an organic liquid which softens and swells the organic polymer material, the organic polymer material and the diluent material can be secured together in the resulting diaphragm by heating after deposition at a temperature well below the melt-softening temperature of the organic polymer material. Avoiding temperatures near the bonding or melt-softening temperature of the polymer material can be advantageous where the higher melt-softening temperatures cause decomposition of the organic polymer material containing functional groups or where such heating undesirably alters the porosity of the diaphragm, e.g., by melting and flowing the organic polymer material. As an example, once a coating of organic polymer material and fibrous diluent material is deposited on the cathode, the coating can be subjected to a temperature and pressure for a time sufficient to soften the diluent material fibers thereby resulting in an interlocked diaphragm matrix at the points of contact between the diluent material fibers leaving a diaphragm of fibrous diluent material and the organic polymer material.

In one embodiment for using organic liquid-aided bonding, organic polymer fibers are pulverized, mashed or chopped in high-shear mixing equipment, slurried in water and the resultant fibers are vacuum-deposited from the slurry onto a cathode. Propylene carbonate is then drawn through the deposited mat of fibers to wet the fibers, the mat rinsed with water to remove the bulk of the propylene carbonate followed by heating at from about 80° to 250° C., preferably about 100° to 150° C. for an effective length of time, suitably from about 0.5 to 2 hours to join and secure the organic polymer fibers at contact points with other organic polymer fibers.

Another manner of preparing a diaphragm containing both the organic polymer material and a diluent material functioning as a binder includes depositing a layer of the diluent material as fibers on the substrate, impregnating the fiber layer with a fluorinated organic polymer material containing the functional groups, e.g., spraying or vacuum-depositing the fluorinated organic polymer material on the surface of the fibrous diluent material layer, and thereafter treating the fluorinated organic polymer material and fibrous diluent material as previously described.

In yet another manner of preparing the diaphragm, the organic polymer material containing the functional groups in the form of fibers can be partially coated with a diluent material having a lower melting point than the organic polymer fibers. The diaphragm can then be deposited from the partially diluent-coated, organic polymer fibers and treated by heating to the melting point of the diluent material, followed by cooling to bind the organic polymer fibers. In this embodiment the diluent material also functions as a binder.

In an embodiment of this invention using a solution of the organic polymer material having the functional groups, a diaphragm is formed upon a foraminous cathode of an electrolytic cell by providing a slurry including a nonaqueous slurry medium, fibrillated polyfluorocarbon, fibrous pore forming material and organic polymer material, passing the slurry through the foraminous cathode, whereby a layer of the fibrillated polyfluorocarbon, the fibrous pore forming material, organic polymer material and residual slurry medium is deposited thereon, and removing the residual slurry medium, whereby the resultant diaphragm is secured upon the cathode.

In another embodiment, the diaphragm is formed upon a foraminous cathode by providing an aqueous or nonaqueous slurry containing fibrillated polyfluorocarbon and fibrous pore forming material, passing the slurry through the foraminous cathode to deposit a layer of such materials, impregnating the layer of materials with an aqueous or nonaqueous solution of organic polymer material having the functional groups, and thereafter removing the residual liquid from the impregnated layer to secure the diaphragm upon the cathode.

In still another embodiment, a solution of the organic polymer material having the functional groups can be admixed with fibrous pore forming material, whereby the organic polymer material can be adsorbed on or into the fibrous pore forming material. A slurry of fibrillated Polyfluorocarbon and the fibrous pore forming material with organic polymer material adsorbed thereon can be passed through a foraminous cathode to deposit the material thereon. Thereafter the slurry medium can be removed, e.g., by evaporation, to secure the diaphragm upon the cathode. In each embodiment using the pore forming material in this invention, after the diaphragm, including the pore forming material, is secured upon the cathode, the pore forming material can be removed, whereby porosity and permeability are provided to the diaphragm. The particulate pore forming material is subsequently removable, e.g., by chemical leaching after deposition of the diaphragm, by heating to decomposition temperatures of the pore forming material following deposition of the diaphragm, or by removal in situ during subsequent operation of the cell by the chemical action of an electrolyte within the cell. Suitable pore former materials include cellulosic materials such as cellulose or rayon, polypropylene, starch, polyethylene and nylon.

Where the organic polymer material is in the form of fibers, the fibers can be deposited in a random orientation throughout the thickness of the diaphragm. However, such fibers generally lie with the lengthwise axis parallel to the substrate. A sufficient portion of organic polymer fibers deposited on the substrate should have lengths greater than the openings of the substrate. Then the fibers can bridge the openings and allow for formation of the diaphragm mat. After the openings have been bridged, organic polymer fibers and other shaped organic polymer material of much smaller dimensions can be deposited without being drawn through the openings.

In another embodiment a fine screen, mesh or mat having openings smaller in size than the porous substrate can be placed between the substrate and the diaphragm. The fine screen, mesh or mat provides additional surface area and the synthetic diaphragm can be deposited upon the screen with a more uniform thickness.

The fine screen, mesh or mat can be either a permanent overlay on the porous substrate, i.e., an overlay which will remain as part of the electrolytic cell structure and be substantially unaffected by the cell environment, or a temporary overlay on the substrate, i.e., an overlay used to achieve the more uniform diaphragm and subsequently removed, for example, by chemical decomposition either before or during cell operation. Suitably, the permanent screen, mesh or mat can be, e.g., a metallic screen, while the temporary screen, mesh or mat can be cotton, cellulose, wool or rayon can be formed in situ upon the porous substrate by depositing fibers of such temporary materials from a slurry. The topcoat or overlay previously described can be used following deposition of the organic polymer material on the fine screen or mesh to achieve compression of the diaphragm.

In one cell suitable to produce alkali metal hydroxide and chlorine from brine, the diaphragm can include perfluorinated organic polymer material containing carboxylic acid groups. During operation of the cell, the functional groups on the organic polymer material will be present as the alkali metal salt of the carboxylic acid. The diaphragm formed from organic polymer material containing carboxylic acid groups or salts thereof can provide excellent current efficiency through reduction of hydroxyl ion backmigration.

Alkali metal chloride brine, e.g., sodium chloride brine, used in the electrolysis process with the deposited diaphragms of this invention should preferably be of high quality to obtain optimum performance. By high quality is meant that the hardness of the brine is low, that is, the content of alkaline earth metal ion impurities such as calcium, barium, magnesium, and strontium is less than 50 parts per billion (ppb), preferably, less than 20 parts per billion. The brine can be treated to reduce the calcium, magnesium, barium, and strontium ion content to acceptable levels. Primary brine treatment with sodium carbonate and sodium hydroxide can reduce the impurities to around 2 to 5 parts per million (ppm). Secondary brine treatment can then reduce impurities to the ppb level. For example, the alkaline earth metal cations can be removed by treatment with a phosphate as described in U.S. Pat. No. 4,176,022 or treatment can be conducted by contacting the brine with an ion exchange resin such as Amberlite XE-318 available from Rohm and Haas Co.

U.S. Pat. No. 4,483,754 discloses that iodine levels greater than one part per million in sodium chloride brines impair performance in electrolytic cells utilizing cation exchange membranes. It has now been found desirable to feed brines with iodine levels under 500 parts per billion to electrolytic chlor-alkali cells having synthetic diaphragms fabricated of organic polymer material having the ion exchange groups. Preferably, the iodine levels of the brine are less than 200 parts per billion. The term "iodine" is meant to refer to any iodine-containing species such as iodide ions, periodide ions, periodate ions or molecular iodine. It has been found that brine containing high levels of iodine can be treated to reduce the iodide or iodine content to under 500 ppb, preferably less than 200 ppb by contacting the brine, e.g., sodium chloride brine with a polyvinylpyridine-based anion exchange resin such as a poly-4-vinylpyridine resin, poly-2-vinylpyridine resin, poly-2-methyl-5-vinylpyridine resin, or a polyvinyl(alkyl)pyridine wherein alkyl is a lower alkyl containing from one to four carbon atoms.

Sodium chloride brine with reduced iodine content can then be utilized in an electrolytic cell equipped with a diaphragm fabricated of perfluorinated organic polymer material containing ion exchange groups for the production of chlorine and sodium hydroxide. Removal of iodine to the described levels avoids a decrease in current efficiencies and an increase in voltage which can result from precipitation of iodine compounds within the ion exchange material.

In the electrolysis of sodium chloride brine with the deposited diaphragms of this invention, sodium hydroxide concentrations from about 12 to 20 weight percent or more in the catholyte or cell liquor can be achieved efficiently, i.e., at economic current efficiencies. The electrolysis method preferably is such as to attain catholyte sodium hydroxide concentrations above 12 weight percent, more preferably above about 13 weight percent with cathode current efficiencies of greater than 88%. However, at such high sodium hydroxide concentrations, the anolyte can become depleted of salt, i.e., sodium chloride. It can be advantageous to maintain a high brine concentration in the anolyte via anolyte resaturation for best results with this invention.

In operation of cells containing the deposited diaphragms of this invention, the brine feed should contain preferably from about 290 to 330 g/l of sodium chloride and the anolyte will contain from about 120 to 275 g/l of sodium chloride. Anolyte resaturation can be employed to maintain the anolyte concentration to a higher level of from about 230 to 290 g/l In one manner of anolyte resaturation, all the brine fed to the anolyte compartment is not percolated through the diaphragm, rather a portion of the brine is withdrawn from the anolyte compartment, e.g., as an overflow where the salt content is increased, ideally to near saturation levels. Excess brine containing about 290 to 330 g/l sodium chloride is fed to the cell at a rate exceeding the anolyte percolation rate through the diaphragm and an overflow brine stream having a depleted sodium chloride concentration is withdrawn. The overflow brine stream can be resaturated and recirculated to the anolyte compartment. In the recirculation loop the depleted brine stream can be resaturated to a higher concentration of about 320 g/l sodium chloride by dissolving additional solid sodium chloride. For example, the depleted overflow brine can be passed through a bed of solid sodium chloride to reach the saturation level. Thereafter, the resaturated brine can be combined with fresh saturated make up brine and fed to the electrolytic cell. The recirculated and resaturated brine along with any make up brine can be treated to remove undesired impurities prior to entry into the anolyte compartment. Alternatively, the depleted brine can be resaturated from a pure solid salt that has been previously treated to remove the undesirable impurities. Another manner of maintaining a high sodium chloride concentration in the anolyte is by addition of pure solid salt directly to the anolyte compartment, e.g., addition of a sodium chloride slurry along with or in place of the brine feed to the anolyte compartment. Resaturation of the anolyte feed can aid production of a higher caustic strength of from about 12 up to 20 weight percent, preferably above about 13 weight percent in the catholyte with a current efficiency exceeding 88%.

The operating temperature of the cell will be generally from about 70° to 101° C., more preferably from about 85° to 99° C. Higher operating temperatures can improve the energy efficiency of the cell through voltage reductions.

During operation of the cell, the pH of the anolyte can range from about 1.5 to 5.0, preferably from 1.5 to 4.0. In a chlor-alkali cell, chlorine evolved at the anode lowers the pH of the anolyte, while back migration of hydroxyl ions into the anolyte increases the anolyte pH. Although the electrolytic process of this invention can advantageously reduce the back migration of the hydroxyl ions, the addition of acid to the anolyte can improve the anode current efficiency and improve the purity of the catholyte product by reducing the production of chlorates. Hydrochloric acid can be added in an amount suitable to maintain the pH within the desired range. While acid addition in electrolytic cells with asbestos diaphragms tends to deteriorate the asbestos, the synthetic diaphragms formed from organic polymer material with the functional groups are asbestos-free and should not suffer from acid addition. It may, therefore, be practical to regulate the oxygen produced at the anode via controlled acid addition. Thus, the oxygen content may be reduced to a level whereat the chlorine product can be used for chlorinations without prior liquefaction to remove oxygen.

The present invention is illustrated by the following examples which are illustrative only.

EXAMPLE I

A perfluorinated polymer material containing pendant methyl ester groups (Flemion ® HB, a reinforced membrane material available from Asahi Glass Company, Ltd.) was shaped into the form of fibers by extruding the polymer at 240° C. through a die having a 0.023 inch diameter and stretching the resultant filament to reduce the diameter to between 150 and 200 microns. The filament was cut to 0.25" lengths and hydrolyzed in aqueous 25 weight percent sodium hydroxide at 95° C. to convert the polymer material to the sodium salt form. The hydrolyzed fibers were then washed with distilled water, air dried and placed in a Shatter Box (Spex. Industries, Inc.) for 2 minutes to defibrillate, flatten and break up the fibers.

The crushed polymer material was wetted with a small quantity of isopropanol and 500 ml of a 10% aqueous solution of HCl was added to convert the material to the acid form. A mixture containing 6.8 g of $-12$ to 42 mesh fibers, 3.4 g of $-42$ to 60 mesh size fibers, 5.5 g of $-60$ to 100 mesh size fibers, 3.6 g of $-100$ to 200 mesh size fibers, and 0.6 g of $-200$ mesh size fibers was slurred with 40 g of propylene carbonate and 360 g of water. The fibers were deposited on a perforated steel cathode (about 60 holes per square inch, each hole having about 2 mm diameter) covered with a filter paper (Whatman No. 41) to give a diaphragm layer of about 0.50 pound of fiber per square foot of cathode. A second filter paper was placed over the deposited fibers, followed by a 5-mil thick Teflon film as a top layer. This cathode assembly was placed into an oven and heated at between 120° to 130° C. for 0.5 hours while a vacuum of 24 inches of mercury was applied to compress and bind the polymer material together.

The diaphragm was then allowed to cool and the Teflon cover sheet was removed.

The resulting cathode and diaphragm were placed in a chlor-alkali cell having as a anode a ruthenium oxide/-titanium oxide coated, titanium mesh and operated to produce sodium hydroxide and chlorine. The cell was operated at temperatures from 98° C. to 101° C. with a current density of 133 amperes per square foot (ASF). The following results were obtained.

| Days Operated | Anolyte NaCl concentration (g/l) | Current Efficiency % | Catholyte NaOH (Wt. %) | Voltage | KWH/ton NaOH |
|---|---|---|---|---|---|
| 1 | 178 | 97.9 | 13.5 | 3.00 | 2109 |
| 2 | 149 | 96.7 | 15.8 | 2.98 | 2114 |
| 20 | 185 | 91.4 | 18.3 | 3.00 | 2250 |
| 56 | 191 | 97.3 | 16.8 | 2.99 | 2107 |
| 97 | 178 | 95.5 | 18.1 | 3.00 | 2155 |
| 118 | 178 | 97.1 | 17.3 | 3.02 | 2132 |
| Average | 183 | 96.0 | 17.2 | 2.99 | 2138 |

EXAMPLE II

A diaphragm was prepared as in Example I with the following exceptions. The slurry contained 4.0 g of −20 to 42 mesh size fibers, 1.9 g of −42 to 60 mesh size fibers, 4.1 of −60 mesh size fibers, 18 g of propylene carbonate, 146 g water and 3.6 g of a viscosity modifier (Rheothik ® 80-11). The mixture was stirred on a hot plate for about 30 minutes during which time the temperature of the slurry increased to 90° C. The slurry was then allowed to cool for about one hour at room temperature and the organic polymer material was deposited on a perforated steel cathode (about 60 holes per square inch, each hole having about 2 mm diameter) covered with a filter paper (Whatman No. 41) to give a diaphragm layer of about 0.25 pound of fiber per square foot of cathode. A second filter paper was placed over the deposited fibers followed by the Teflon topcoat as before. The vacuum during heating at 120° to 130° C. for 30 minutes was 25 to 26 inches of mercury. The diaphragm was placed in a cell operated as in Example I to give the following results.

| Days Operated | Anolyte NaCl concentration (g/l) | Current Efficiency % | Catholyte NaOH (Wt. %) | Voltage | KWH/ton NaOH |
|---|---|---|---|---|---|
| 1 | 195 | 97.1 | 16.8 | 2.86 | 2020 |
| 20 | 196 | 92.8 | 15.7 | 2.82 | 2084 |
| 41 | 191 | 91.6 | 16.7 | 2.84 | 2125 |
| 62 | 197 | 91.9 | 17.1 | 2.85 | 2127 |
| 90 | 189 | 90.4 | 17.3 | 2.86 | 2170 |
| 111 | 205 | 93.0 | 14.5 | 2.85 | 2102 |
| 132 | 201 | 94.0 | 14.2 | 2.84 | 2073 |
| 160 | 205 | 96.4 | 14.0 | 2.86 | 2034 |
| Average | 200 | 92.7 | 15.8 | 2.85 | 2107 |

The deposited diaphragms of perfluorinated polymer material including the functional groups of this invention have demonstrated improved performance characteristics when used in a chlor-alkali cell, including operation at low voltage and high current efficiency, and a low overall power consumption, i.e., kilowatt hours per ton of sodium hydroxide under cell conditions comparable to those used with conventional asbestos type diaphragms or asbestos-polymer diaphragms.

Obviously, many modifications and variations of the present invention are possible in light of the above disclosure. It is, therefore, to be understood that, within the scope of the appended claims, the invention may be practices otherwise than as specifically described.

We claim:

1. A liquid permeable diaphragm for an electrolytic cell, said diaphragm consisting essentially of organic material, the organic material comprising polymer fibers containing functional groups selected from the group consisting of —COOR, —COOM, —COX, —CN, —CONR′R″, —SO$_3$M, —SO$_2$NH$_2$, —PO(OR)$_2$, —PO(OM)$_2$, —PO(OX)$_2$, —OPO(OR)$_2$, —OPO(OM)$_2$, and —OPO(OX)$_2$ where R is an aryl or a C$_1$ to C$_{10}$ alkyl group; M is H, an alkali metal or an ammonium group; R′ and R″ are each independently either H or a C$_1$ to C$_{10}$ alkyl group; and X is Cl or F.

2. The diaphragm of claim 1 wherein the organic polymer fibers are perfluorinated.

3. The diaphragm of claim 2 further including a diluent polymer material.

4. The diaphragm of claim 3 wherein the diluent material is fibrous.

5. The diaphragm of claim 4 wherein the diluent material is fibrillated polytetrafluoroethylene.

6. The diaphragm of claim 1 wherein the functional groups are selected from the group consisting of —COOR, —COOM, —COX, —CN, and —CONR′R″ where R is an aryl or a C$_1$ to C$_{10}$ alkyl group; M is H, an alkali metal or an ammonium group; R′ and R″ are each independently either H or a C$_1$ to C$_{10}$ alkyl group; and X is Cl or F.

7. A liquid permeable, cation exchange diaphragm for an electrolytic cell, said diaphragm consisting essentially of organic material, the organic material comprising polymer fibers containing functional groups selected from the group consisting of —COOM, —SO$_3$M, —PO(OM)$_2$, and —OPO(OM)$_2$, where M is H, an alkali metal or an ammonium group.

8. The diaphragm of claim 7 wherein the organic polymer fibers are perfluorinated.

9. The diaphragm of claim 8 further including a diluent polymer material.

10. The diaphragm of claim 9 wherein the diluent material is fibrous.

11. The diaphragm of claim 10 wherein the diluent material is fibrillated polytetrafluoroethylene.

12. The diaphragm of claim 7 wherein the functional groups are —COOM where M is H, an alkali metal or an ammonium group.

13. A non-asbestos, liquid permeable, fibrous diaphragm for an electrolytic cell wherein the fibers of the diaphragm consist essentially of organic polymer material containing functional groups selected from the group consisting of —COOR, —COOM, —COX, —CN, —CONR′R″, —SO$_3$M, —SO$_2$NH$_2$, —PO(OR)$_2$, —PO(OM)$_2$, —PO(OX)$_2$, —OPO(OR)$_2$, —OPO(OM)$_2$, and —OPO(OX)$_2$ where R is an aryl or a C$_1$ to C$_{10}$ alkyl group; M is H, an alkali metal or an ammonium group; R′ and R″ are each independently either H or a C$_1$ to C$_{10}$ alkyl group; and X is Cl or F.

14. The diaphragm of claim 13 wherein the functional groups are selected from the group consisting of —COOR, —COX, —CN, and —CONR′R″ where R is an aryl or a C$_1$ to C$_{10}$ alkyl group; M is H, an alkali metal or an ammonium group; and R′ and R″ are each independently either H or a C$_1$ to C$_{10}$ alkyl group; and X is Cl or F.

15. The diaphragm of claim 13 wherein the organic polymer material is perfluorinated.

16. The diaphragm of claim 15 further including a perfluorinated diluent polymer material.

17. A non-asbestos, liquid permeable, fibrous cation exchange diaphragm for an electrolytic cell wherein the fibers of the diaphragm consist essentially of organic polymer material containing functional groups selected from the group consisting of —COOM, —SO$_3$M, —PO(OM)$_2$, and —OPO(OM)$_2$, where M is H, an alkali metal or an ammonium group.

18. The diaphragm of claim 17 wherein the functional groups are —COOM where M is H, an alkali metal or an ammonium group.

19. The diaphragm of claim 17 wherein the organic polymer material is perfluorinated.

20. The diaphragm of claim 19 further including a perfluorinated diluent polymer material.

21. A method of producing an asbestos-free liquid permeable diaphragm consisting essentially of organic polymer material for an electrolytic cell comprising:

(a) providing a slurry including a liquid medium and thermoplastic organic polymer material containing functional groups selected from the group consisting of —COOR, —COOM, —COX, —CN, —CONR′R″, —SO$_3$M and —SO$_2$NH$_2$ where R is an aryl or a $C_1$ to $C_{10}$ alkyl group; M is H, an alkali metal or an ammonium group; R' and R" are each independently either H or a $C_1$ to $C_{10}$ alkyl group; and X is Cl or F;

(b) depositing a layer of the slurried polymer material upon a foraminous cathode of the electrolytic cell; and (c) treating the polymer-coated cathode to bind said polymer material.

22. The method of claim 21 wherein the organic polymer material is perfluorinated.

23. The method of claim 22 wherein the thermoplastic organic polymer material is substantially fibrous.

24. The method of claim 22 wherein the slurry further includes a minor structurally reinforcing amount of a diluent polymer material.

25. The method of claim 24 wherein the diluent material is a fibrillated polytetrafluoroethylene.

26. The method of claim 25 wherein the liquid medium comprises water including a minor amount of a nonionic surfactant and a minor amount of a thickening agent.

27. The method of claim 25 further including covering the foraminous cathode with a removable, temporary mat prior to deposition, thereafter vacuum-depositing the layer of organic polymer material onto the temporary mat and subsequently removing the temporary mat after treatment to bind the organic polymer material.

28. The method of claim 25 wherein the treatment comprises heating the organic polymer material and fibrillated polytetrafluoroethylene-coated cathode at temperatures beneath the sintering or decomposition temperatures of the fibrillated polytetrafluoroethylene and the organic polymer material having the functional groups to secure the diaphragm upon the cathode.

29. The method of claim 25 wherein the slurry further includes a pore forming material.

30. The method of claim 25 wherein the slurry further includes a pore forming material and the thermoplastic organic polymer material is present as a solution of such material.

31. The method of claim 22 wherein the liquid medium comprises an organic liquid capable of softening the organic polymer material and swelling the polymer material to a substantially similar extent as the organic polymer material swells in an operating cell environment.

32. The method of claim 31 wherein the organic liquid is selected from the group consisting of N-methylpyrrolidone, propylene carbonate, dimethyl formamide, dimethyl sulfoxide, isopropanol and ethanol.

33. The method of claim 21 wherein the treatment of the organic polymer material-coated cathode comprises heating the organic polymer material-coated cathode at temperatures and for a time sufficient to bind the organic polymer material.

34. The method of claim 21 wherein the slurry further includes a pore forming material.

35. A process for producing chlorine and alkali metal hydroxide in an electrolytic cell comprising:

(a) feeding aqueous alkali metal chloride brine into an anolyte compartment of the cell;

(b) percolating said brine through an electrolyte permeable, asbestos-free, cation exchange diaphragm consisting essentially of organic polymer material, the organic polymer material comprising fibers containing functional groups selected from the group consisting of —COOM, —SO$_3$M, —PO(OM)$_2$ and —OPO(OM)$_2$, where M is an alkali metal, into a catholyte compartment of the cell, said diaphragm dividing the anolyte compartment having an anode therein and the catholyte compartment having a cathode therein;

(c) passing an electric current from the anode to the cathode; and (d) recovering chlorine from the anolyte compartment and alkali metal hydroxide from the catholyte compartment.

36. The process of claim 35 wherein the cation exchange diaphragm further includes a minor structurally reinforcing amount of unsintered fibrillated polyfluorocarbon.

37. The process of claim 36 wherein the polyfluorocarbon is polytetrafluoroethylene.

38. The process of claim 35 wherein the brine feed contains less than 50 parts per billion alkaline earth metal ions and less than 500 parts per billion iodine.

* * * * *